United States Patent [19]

Heckel

[11] Patent Number: 5,286,278
[45] Date of Patent: Feb. 15, 1994

[54] DRY PROCESS FOR THE COLD BRIQUETTING OF METALLURGICAL DUSTS

[76] Inventor: Karl Heckel, Franz Schmidtweg 24, A-8046 Graz, Austria

[21] Appl. No.: 835,429
[22] PCT Filed: Aug. 29, 1990
[86] PCT No.: PCT/AT90/00085
§ 371 Date: Feb. 25, 1992
§ 102(e) Date: Feb. 25, 1992
[87] PCT Pub. No.: WO91/03577
PCT Pub. Date: Mar. 21, 1991

[30] Foreign Application Priority Data

Aug. 30, 1989 [AT] Austria ............................. 2041/89

[51] Int. Cl.⁵ .............................................. C04B 35/16
[52] U.S. Cl. ............................................ 75/746; 75/773
[58] Field of Search ................................ 75/773, 746

[56] References Cited

U.S. PATENT DOCUMENTS

| | | | |
|---|---|---|---|
| 833,630 | 10/1906 | Reinke | 75/73 |
| 3,374,085 | 3/1968 | Stone | 75/773 |
| 3,617,254 | 11/1971 | Imperato | 75/773 |
| 4,105,457 | 8/1978 | Pietsch | 75/773 |
| 4,846,884 | 7/1989 | Shigematsu | 75/773 |

FOREIGN PATENT DOCUMENTS

| | | |
|---|---|---|
| 1135501 | 8/1962 | Fed. Rep. of Germany . |
| 1142442 | 1/1963 | Fed. Rep. of Germany . |
| 1209132 | 1/1966 | Fed. Rep. of Germany . |

OTHER PUBLICATIONS

I&SM, Apr. 1981; D. R. Fosnacht: "Recycling of ferrous steel plant fines, state-of-the-art"; pp. 22-26.
International Iron and Steel Institute, Committee on Environmental Affairs, (Brussels), Oct. 1987; "The management of steel industry by-products and waste"; pp. 55-69.

*Primary Examiner*—Peter D. Rosenberg
*Attorney, Agent, or Firm*—Spencer, Frank & Schneider

[57] ABSTRACT

A dry process for cold briquetting of metallurgical dusts, including converter steel dust, to provide transportable briquettes which do not give off dust, including the steps of admixing metallurgical dust and at least one basic additive selected from the group consisting of lime, dolomite, magnetite, dunite, olivine and bauxite, in burnt or unburnt form, to provide a mixture, and forming the mixture into briquettes at pressures in excess of 10,000 bar and at ambient temperature.

3 Claims, No Drawings

DRY PROCESS FOR THE COLD BRIQUETTING OF METALLURGICAL DUSTS

BACKGROUND OF THE INVENTION

In the iron and steel industry, metallurgical dusts are produced in numerous metallurgical processes. Thus, in the manufacture of steel using known L.D.-processes, the corresponding converter steel dust is produced and is collected via suitable filtering plants. The dust has a very high metal content, iron being present in predominantly metallic or oxidic form, depending, in each case, on the method used.

The dumping of such dusts constitutes an increasingly difficult environmental and cost problem. Its high metal content argues in favour of a reutilization of the dust, and there was, therefore, also no shortage in attempts to return this dust into the steel manufacturing process.

Dusts having a high content of metallic iron and, above all, portions of pyrophoric iron, are briquetted using hot briquetting processes and are returned to the converter. Also known are the methods of direct feeding of dust into the converter and granulation processes, with the addition of binding agents. In the case of these last-mentioned methods, substances which are not very favourable for the metallurgical process, are, however, also introduced into the converter. Thus, U.S. Pat. No. 833 630 describes a process for the briquetting of brittle ores, wherein the use of a special limestone mixed with magnesium oxide and Portland cement is regarded as being essential since, otherwise, an adequate strength of the ore briquette is not obtained. The water content of 18 to 20% contained in the ore is of decisive importance for the hydraulic reaction with the Portland-cement binding agent. In this known briquetting process, the desired strength of the ore briquette is obtained solely through the reaction of the Portland cement.

A similar process is described in DE-B 1 142 442. The subject matter of this publication is a process for the briquetting of refined ores. The basic additive, in particular magnesium hydrate and/or calcium hydrate, used for the briquetting of the refined ores, constitutes a binding agent which reacts with the carbon dioxide from the air to form a carbonate and, in this way, ensures the desired strength of the ore briquette.

Metallurgical dusts which require disposal or, if possible, recycling are also produced in other metallurgical processes, such as in the manufacture of electrosteel or in the aluminium industry.

It is now the object of the present invention to provide a new process for the cold briquetting of metallurgical dusts which will overcome the disadvantages of previously known processes and which permits an advantageous reutilization of, for example, converter steel dust in the converter.

SUMMARY OF THE INVENTION

The object of the present invention is, therefore, a dry process for the cold briquetting of metallurgical dusts, in particular of converter steel dust, under high pressure and using a basic additive, which is characterized in that the dust, together with lime, dolomite, magnesite, dunite, olivine or bauxite, in each case in burnt or unburnt form and, in each case, alone or in mixtures of the aforementioned, is formed into transportable briquettes, which do not give off dust, at pressures in excess of 10,000 bar at standard temperature (20° C.).

Using the cold briquetting process according to the invention, it is possible to convert metallurgical dusts, in particular converter steel dust, into transportable briquettes at standard temperature (20° C.) and applying high pressures in excess of 10,000 bar, using basic additives. These briquettes can be returned, in an environmentally acceptable form, to the steel making process for the utilization of the useful substances contained therein. At the same time, the dry briquetting process according to the invention solves the environmental problem which was, previously, inseparably linked to the disposal of the metallurgical dust. In this regard, it has been proved to be particularly advantageous that, when carrying out the process according to the invention, there is no further adverse impact on the environment as the result of harmful substances from the waste gases or organic or inorganic binding agents.

The additives used in the briquetting process according to the invention, which additives, on the one hand, even permit a briquetting of the metallurgical dusts, in particular of converter steel dust and which, secondly, have a positive effect on the refining process, are lime, dolomite, magnesite, dunite, olivine, bauxite, in burnt or unburnt form, either alone or in mixtures thereof. A particularly advantageous embodiment of the process according to the invention is characterized in that, added to the converter steel dust, are 50 parts by mass of lime to 100 parts by mass of dust, and this mixture is subjected to the cold briquetting process by means of high-pressure presses.

According to a further advantageous embodiment, 40 parts by mass of burnt lime, 5 parts by mass of sintered dunite and 5 parts by mass of burnt bauxite can be added to 100 parts by mass of the converter steel dust.

It is only with the application of the process according to the invention that it has become possible to meet the problems set out above, in a targeted manner. For, if one were to attempt to form, for example, a converter steel dust, on an extrusion press or a ring-roller press, into briquettes, then it would be impossible to produce a form-retaining body. Because of its extreme fineness (100% smaller than 20 um), converter steel dust has the flow capacity of water and can be pressed in a dry process at standard temperature, with the addition of specific basic additives, into transportable briquettes which do not give off dust only under extreme pressures in excess of 10,000 bar, as is peremptorily provided by the process according to the invention.

DESCRIPTION OF THE PREFERRED EMBODIMENTS

The process according to the invention will be described in more detail in the following Examples:

EXAMPLE 1

500 t of converter steel dust from an L.D.-converter are removed via a Lurgi dust collector and, with the addition of 40 parts by mass of burnt lime, 5 parts by mass of sintered dunite and 5 parts by mass of burnt bauxite to 100 parts by mass of converter steel dust, are briquetted at a pressure of about 12,000 to 15,000 bar in high-pressure presses at standard temperature.

The transportable briquettes which do not give off dust can be returned to the L.D.-converter using the usual charging means.

EXAMPLE 2

100 t of dust from the aluminium industry are briquetted with 10 parts by mass of lime and 5 parts by mass of sintered dunite to 100 parts by mass of dust, at standard temperature and at a pressure in excess of 10,000 bar. The dusts, formed into lumps, can be reutilized in the iron and steel industry

EXAMPLE 3

200 t of dusts obtained from an electric steel plant are pressed at standard temperature and at a pressure in excess of 10,000 bar, to form briquettes together with 10 parts by mass of lime and 5 parts by mass of sintered dunite to 100 parts by mass of dust. The resultant transportable briquettes can be returned for upgrading to the electrosteel manufacturing process, or they can be supplied for use in the nonferrous industry.

What is claimed is:

1. A dry process for cold briquetting of metallurgical dusts, including converter steel dust, to provide transportable briquettes which do not give off dust, comprising:
   a. admixing metallurgical dust and at least one basic additive selected from the group consisting of lime, dolomite, magnetite, dunite, olivine and bauxite, in burnt or unburnt form, to provide a mixture; and
   b. forming the mixture into briquettes at pressures in excess of 10,000 bar and at ambient temperature.

2. The process according to claim 1, wherein the metallurgical dust is converter steel dust, and wherein 50 parts by mass of lime is admixed with 100 parts by mass of the converter steel dust.

3. The process according to claim 1, wherein the metallurgical dust is converter steel dust, and wherein 40 parts by mass of burnt lime, 5 parts by mass of sintered dunite and 5 parts by mass of the burnt bauxite are admixed with 100 parts by mass of the converter steel dust.

* * * * *